Sept. 15, 1970     C. A. VILLEMAIN     3,529,284
TRAFFIC CONTROL SYSTEM AND SIGNAL EQUIPMENT FOR USE THEREIN
Filed June 22, 1967     7 Sheets-Sheet 1
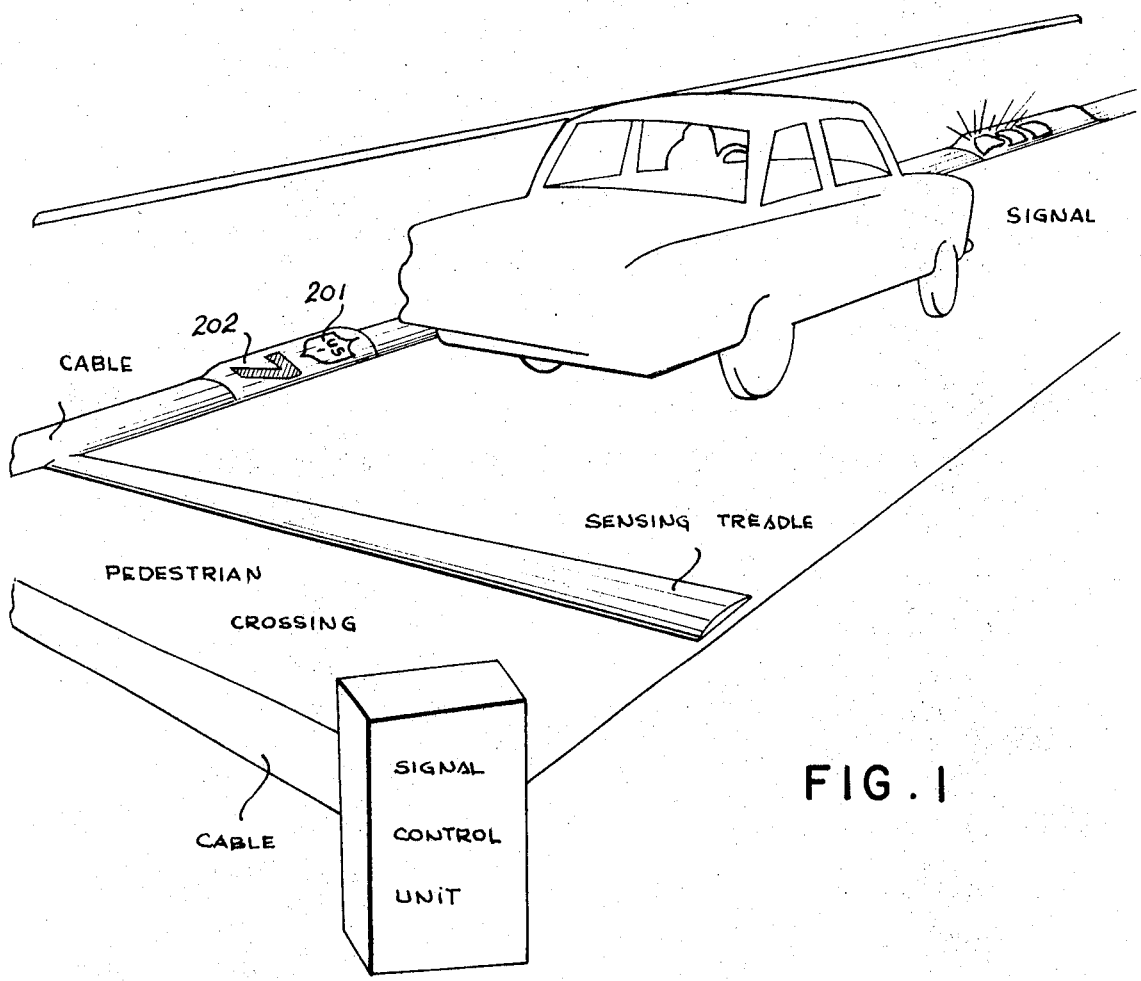
FIG. 1
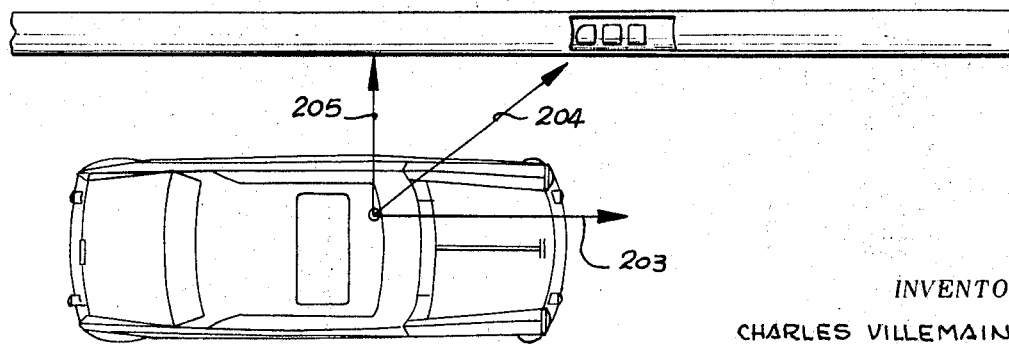
FIG. 1-A
INVENTOR.
CHARLES VILLEMAIN
BY
ATTORNEY

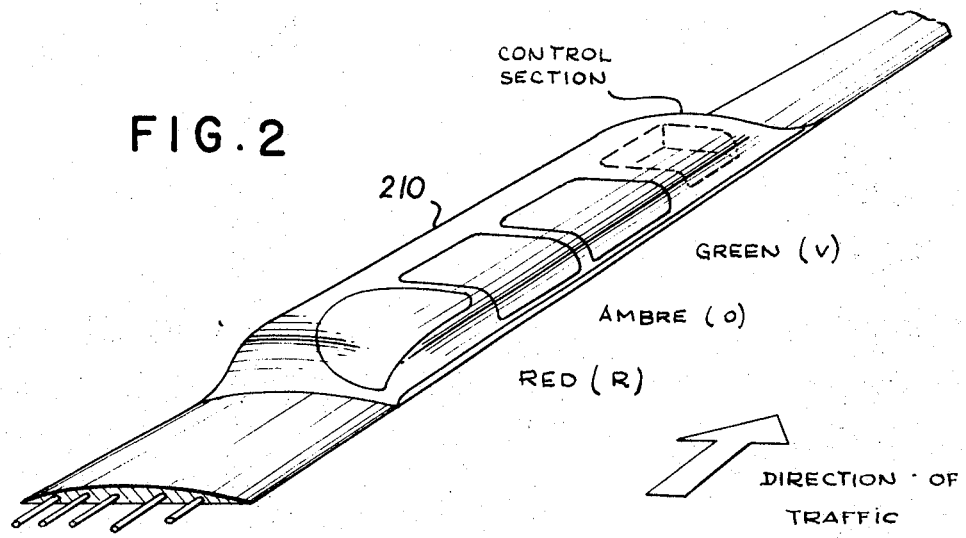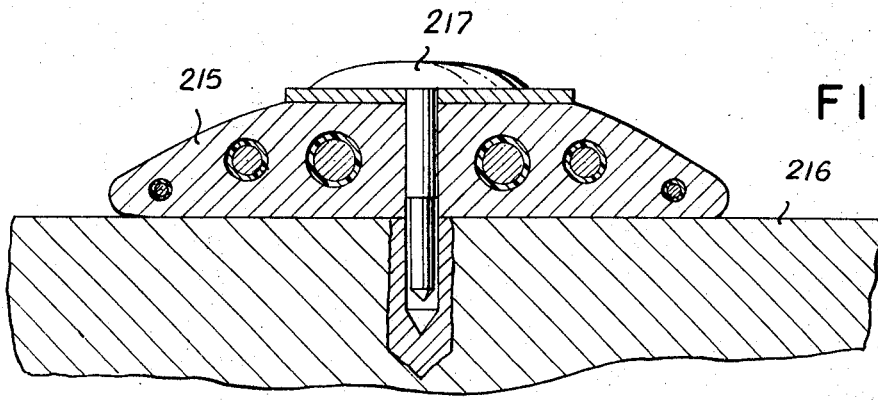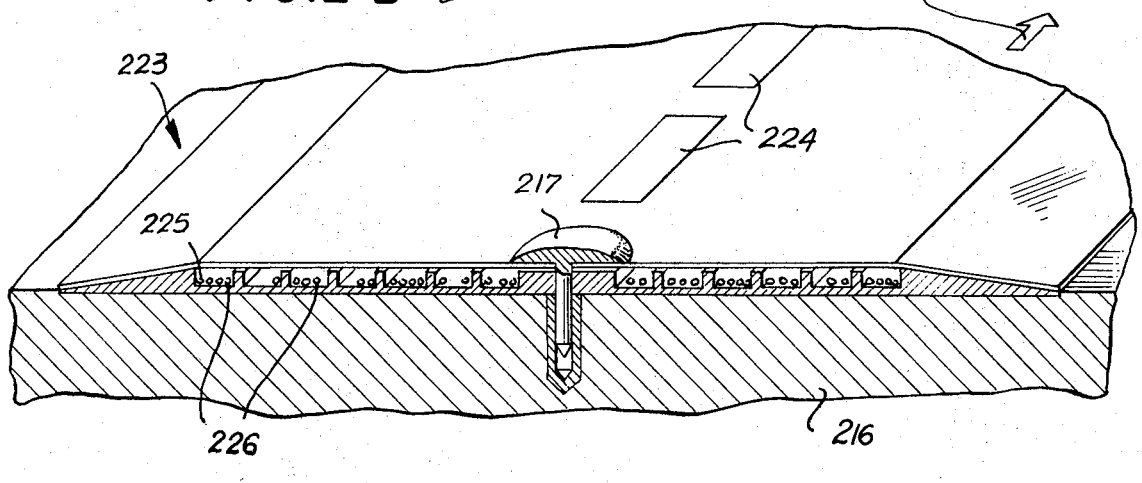

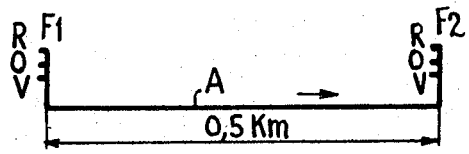
Fig. 13
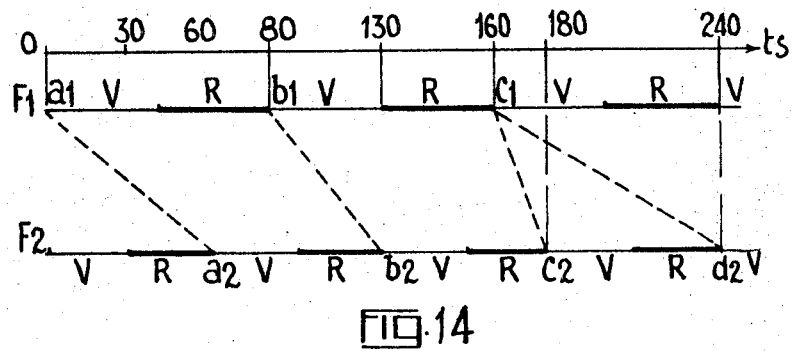
Fig. 14
a) F1  1 2 3 4 5 6 7 8 9 10 11 12 13 14 15 16 17 18 19 20 F2
b) t1 R R R R R R O O O O O V V V V R R R R R R
c) t2 V R R R R R R O O O O O V V V V R R R R R
Fig. 3
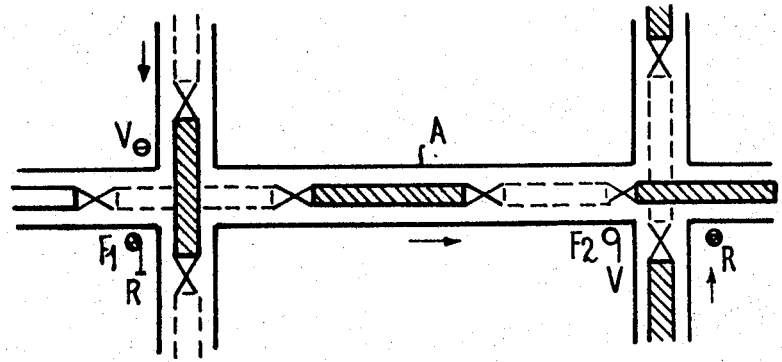
Fig. 5

United States Patent Office 3,529,284
Patented Sept. 15, 1970

3,529,284
TRAFFIC CONTROL SYSTEM AND SIGNAL
EQUIPMENT FOR USE THEREIN
Charles Auguste Villemain, Versailles, France, assignor to Societe d'Etudes Techniques et d'Entreprises Generales Sodetég, Le Plessis-Robinson, France, a corporation of France
Filed June 22, 1967, Ser. No. 647,993
Claims priority, application France, June 24, 1966, 66,894
Int. Cl. G08g 1/08, 1/095
U.S. Cl. 340—35                                     15 Claims

ABSTRACT OF THE DISCLOSURE

A sequential series of traffic control lights are mounted on the roadway to be visible from a single lane and by a single vehicle only, and sequentially energized with green, preferably in intermittent flashes, to form a progressive wave of blinking lights for control of individual vehicles traveling in a group at a speed determined by the progressive green blinks.

The present invention relates to a traffic control system, and to traffic control signal lights for use in the system, and more particularly, to a traffic control system in which the lights are arranged in the system to control the movement of individual vehicles traveling in a given lane.

Traffic jams, particularly in urban and suburban environments often arise due to differences in speeds for vehicles traveling between given sections of a roadway. In particular, when traffic is not controlled on a predetermined roadway, vehicles will often travel at the legal speed limit, only to be forced to stop at traffic control signals controlling intersections. The constant acceleration and stopping, the time taken to reach cruising speed, and the unevenness of traffic flow greatly decreases the average speed not only of the first vehicles to reach traffic lights, but also of subsequent vehicles as traffic backs up behind them.

It is an object of the present invention to provide a traffic control system in which the speed of individual vehicles is controlled in such a manner that the speed between intersections controlled by traffic lights is arranged so that vehicles reaching the traffic light will always have a green light.

In contrast to the well known system of staggered, or progressive lights for one way streets, the present system contemplates control of individual vehicles, or of one or two vehicles at a time, only, traveling within a given lane of traffic, and control of their speed between traffic lights of intersections. The present invention permits adjustment of the speed between such sections, depending upon the length of cycling of the traffic lights and the length of the sections, so that the proper average speed, if maintained by the vehicle, will always permit the vehicle to reach an intersection traffic light on a green signal.

SUBJECT MATTER OF THE INVENTION

The stream of traffic, formed by vehicles, is subdivided into sections (similar to convoys) along a given lane of traffic. The length of these sections (or convoys) is determined by the distance between intersection traffic control signals. Individual traffic control lights are located on, or adjacent the roadway in such a manner that they are primarily visible from only a single vehicle, traveling along the lane to be controlled; the individual traffic control signal lights are then controlled so that a driver, following green lights of his individual control signals will always reach an intersection control signal at the green light.

By adjusting the cyclical repetition rate of flashing of green of individual traffic control signal lights, various control cycles of the intersection control signals can be accommodated, and it is not necessary that the intersection control lights all have the same timing cycle. Rather, the speed of the vehicles between the sections located between intersection control traffic lights is controlled to be different, so that, with a view of the cyclical repetition rate, vehicles arriving at the intersection control lights will always have a green signal.

Vehicle counters can be provided, also controlling the signaling system of the present invention in order to show a red light if the number of vehicles in a group (or convoy) exceeds a predetermined number which can be accommodated in a section, or block of roadway, or lane, between interesection control signals.

The cycling of the intersection control lights themselves can vary, in accordance with the number of vehicles and their maximum speed, as controlled by computers which count the number of vehicles intending to enter a given controlled roadway or lane thereof. Provision can also be made within the timing cycles to permit slowing within a block or section for parking, and to absorb further vehicles which have parked along the lane or roadway and intend to re-enter the stream of traffic.

The structure, organization, and operation of the invention will now be described more specifically with reference to the accompanying drawings, wherein:

FIG. 1 is a pictorial representation of the vehicle control system on a roadway; and FIG. 1A is a top view.

FIG. 2 is a pictorial representation of an individual vehicle control signal with cable, and FIGS. 2A and 2B are sectional views of the cable.

FIG. 3 is a table illustrating a system having twenty individual traffic control signals, cycling twice;

FIG. 5 is a diagrammatic illustration showing the cycling of traffic control signals with intersecting roadways;

FIG. 13 is a diagram of a single lane;

Figure 4:
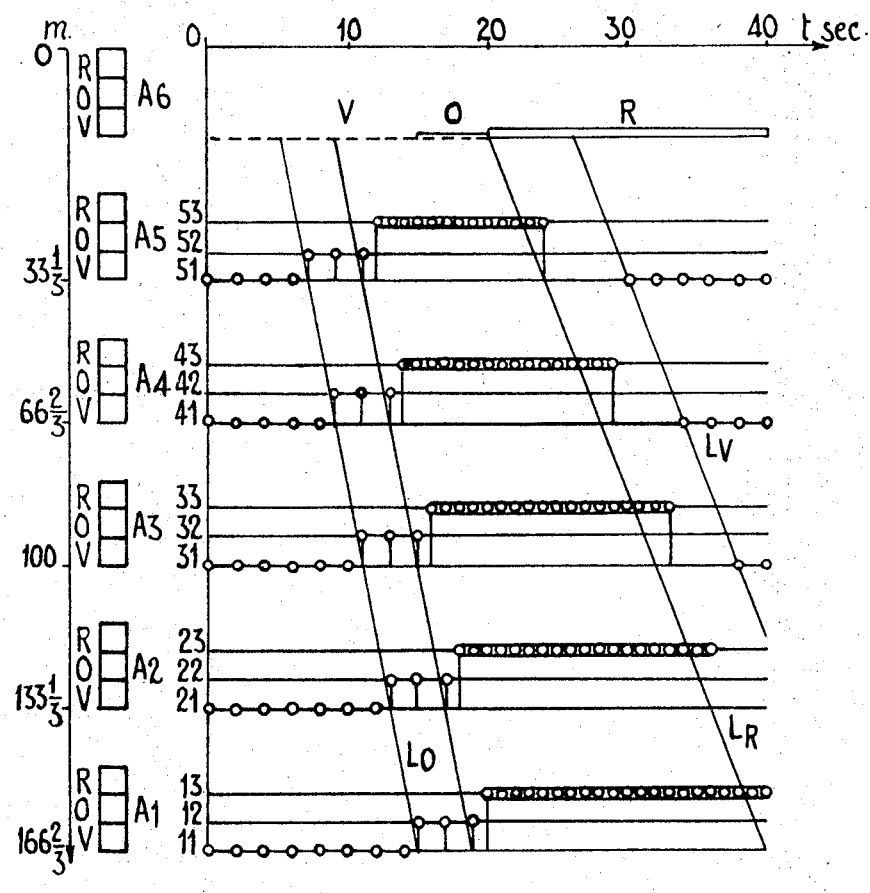
FIG. 4 is a space-time diagram illustrating the cycling of traffic control signals.

and FIG. 14 is a diagram illustrating adjustment of speed for sections having different timing cycles.

Referring now to the drawings and first to FIGS. 13 and 14:

FIG. 13 illustrates in diagrammatic form a roadway, for example, 0.5 km. long, having on either end intersection control signals, in the form of ordinary traffic lights F1 and F2 and successively changing from green (V), amber (O), and red (R). The direction of traffic is indicated by the arrow, that is, from F1 to F2. The cyclic rate $P_1$ of the signal F1 may be assumed to be, for example, 80 seconds; that means that the control signal F1 changes from red to green each 80 seconds; the cyclical rate $p_1$ of the signal F1 may be assumed to be, for to be 60 seconds. The lights observed, successively changing, of the intersection signals F1 and F2 during a period of 240 seconds is then indicated in FIG. 14, in which the letters V and R indicate again green and red respectively; amber has been lumped with red for simplicity. It is immediately apparent that there will be a conflict, or beat, between the states of the signal lights F1 and F2 of a frequency for cyclical P which is equal to the common factor of the cyclical rates $p_1$ and $p_2$, that is, 240 seconds in the chosen example, or, in other words, during each 240 seconds the light pattern of both lights F1 and F2 will repeat.

It is now an object of the control system according to the present invention to provide control for vehicles traveling n the lane of roadway between F1 and F2 so that a group (or convoy) of vehicles going from F1 to F2 will at all times find a green light at F2. This group of vehicles thus must have an intermediate or average speed, along the section or block defined by F1 and F2 which is determined by the cyclical repetition rate of the two intersection control lights F1, F2. It is immediately apparent from FIG. 2 that this average speed is not constant if the cyclical rates of the two lights are not the same. This situation can easily arise if intersection at F2 carries more traffic, there is a merger of traffic lanes or the like.

Referring again to FIGS. 13 and 14, in order to determine the average speed of vehicles which arrive at intersection signal F1 at time $a1$, $b1$, $c1$, just as it changes to green, and which travel to the control signal F2, and reach this control signal F2 at the moment that it changes to green, that is $a2$, $b2$, $c2$, the time between changes of signals must be determined. In the example shown:

$$a2 - a1 = 60 \text{ s.}; \quad b2 - b1 = 40 \text{ s.}; \quad c2 - c1 = 0 \text{s.} \quad (1)$$

The average speeds $u$, for the trip from F1 to F2, over a distance of 0.5 km. are therefore:

$$u_a = 30 \text{ km./hr.} \quad u_b = 45 \text{ km./hr.} \quad u_c = 90 \text{ km./hr.} \quad (2)$$

It is to be noted that the last speed, $u_c$ of almost 60 miles per hour may be too fast for safety, particularly in an urban environment. Let it be assumed that the maximum speed is set at 60 km./hr. (just under 40 m.p.h.). It is thus necessary to utilize an average speed $u_b$ which is less, so that a vehicle from F1 leaving at time $c1$ will arrive at F2 not at the time $c2$ but rather at the time $d2$. Thus, one arrives at:

$$d2 - c1 = 80 \text{ s.}, \text{ and } u_d = 22.5 \text{ km./hr.} \quad (3)$$

In accordance with the present invention, the traffic control system includes traffic signal lights controlling the speeds of vehicles, in groups or convoys, and successively passing the intersection control light F1 in such a manner that the vehicles in the group all travel at the same speed such that they reach the intersection control signal F2 during a time when it is green. In order to obtain this control over the speed of individual vehicles, means are provided to indicate to the vehicles the speed at which they should travel. These indicator means are formed by guide signal lights, spaced along the line of travel, and separated by predetermined intervals. These guide signal lights, hereinafter referred to as guide lights or guide signals, may indicate two states (green-red) or may be in the ordinary form of traffic lights green-amber-red. At any one predetermined moment, successive signal lights thus indicate zones in accordance with the customary indication of traffic lights—red: prohibited; amber: temporarily permitted with caution; green: proceed.

On a section of roadway such as section A (Fig. 13), the green zone thus permits a group, or convoy of vehicles to pass. For a stationary observer, the green zone travels along section A, with successive lights changing to green successively at a speed, $u$, as determined by the cyclincal repetition rate and the distance to be covered, and as explained above. The progressive change of green lights by the guide lights thus gives an indication of the optimum speed at which the lane can be traversed, and still permit reaching the next signal light when it is green, and is additional to the ordinary intersection control signal traffic lights presently provided.

FIG. 3 illustrates diagrammatically the color of light indicated by any one of twenty guide lights, located between intersection controls F1 and F2, instances of time $t1$, $t2$, and corresponding to successive changes of signal colors of intersection controls F1, F2. Line $a$ indicates the assigned number of signal lights, line $b$ and line $c$ indicate the color of the control lights F1, the guide lights 1, 2, 3, ... 19, 20 and of the second intersection control signal F2.

The speed at which the green zone progresses from F1 to F2 depends, of course, on the distance between the two intersection control signals, and thus on the distance between successive individual signal or guide lights and in the cyclical repetition rate of the intersection control signals themselves. In the case illustrated in FIG. 3, it is seen that if the distance between the guide signals is 16⅔ m. and if the time lapse between $t1$ and $t2$ is one second, vehicles guided along a green wave will have a speed of 60 km./hr.

If the intersection control lights at both ends of a controlled lane have the same cyclical repetition rate, then the average speed of each lane of a group of consecutive sections or blocks will be constant. In contrast, however, and this is illustrated in FIG. 14, if the intersection control lights at the ends of the guided lane have different repetition rates, then the average speed with which particular columns, or convoys of vehicles have to move between the signals F1 and F2 will differ from other cycles, as also illustrated in Equations 2 and 3.

FIG. 4 illustrates a space (ordinate)-time (abscissa) diagram, of a section 166⅔ m. long having guide signals $A_6$ (at its entry) and to $A_1$ (at the exit). The guide signal system further includes four guide signals, $A_5$, $A_4$, $A_3$, $A_2$, each 33⅓ m. apart. The particular color indicated by these traffic guide signals is indicated again V (green), O (amber), or R (red) in each instance corresponding to the control selected by the cyclical repetition rate. The length of the duration of the signal is two seconds, which is representative of an optimum speed of 60 km./hr.; the two signals $A_6$ and $A_1$ are green at the same time. The guide signals which are illuminated are indicated by small circles, connected to energizing conductors 11, 12, 13; 21, 22, 23; 31, 32, 33; 41, 42, 43; 51, 52, 53. In this example, as in subsequent examples, the unit values of subscripts or reference numerals indicate the associated color, one for green, two for amber and three for red.

The column $L_O$, the slope of which corresponds to a speed of 60 km./hr. terminates when control light A1 changes to amber, and determines the instance at which the other control signals change from green to amber. Column $L_R$, having the same slope, and being located, in time, by the termination of the red signal, defines the end of the column or convoy or vehicles admitted to the particular controlled section of the lane. In the interval when the guide signal $A_6$ is red, the guide signals located to the right of the column $L_V$ become green again in order to permit travel of vehicles coming from secondary roads, or which come from parking spaces, to proceed toward the control signal $A_1$. The number of vehicles, in a given period of time, can readily be determined by passing a vertical line through the maximum number of green lights indicated in the diagram, which preferably should be completed for more than one cycle.

Intersections in which more than two roads cross may be controlled in accordance with the present invention by suitable adjustment of the timing cycles permitting columns or convoys of vehicles to pass out of a controlled section, keeping in mind the time duration and the speed of approach up to the intersection. Traffic circles or roundabouts can be treated similarly to the merging road intersections, with care being taken to sufficiently break up the columns or lanes in order to permit access to the various distribution lanes of the traffic circles without wait or delay.

FIG. 5 shows an arrangement to control traffic having a pair of intersections, in which green, amber, and red zones are illustrated by crosshatched regions, crossed regions, and by regions enclosed in dotted lines, respectively.

Figure 6:
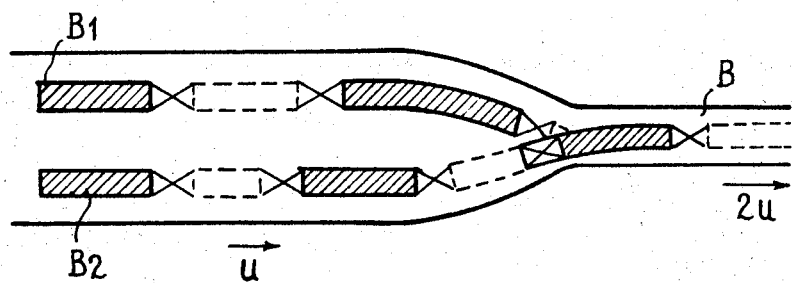
FIG. 6 is a diagrammatic showing illustrating merging roadways and control cycling.

The guide signal lights can be used not only to guide traffic along predetermined straight lanes, or having crossing intersections, but also to control merging or diverging traffic, for example, to control Y-junctions. FIG. 6 shows the state of the guide lights to control traffic along two roads B1, B2, which converge into a single road B. Speed, and the length of the columns of the convoys of vehicles within the roadways B1 and B2 are supposed to be identical. The length of the guide lights in the zone B then will have double the length of the red and of the green periods in the lanes B1 and B2 in order to absorb the converging of two lanes of traffic; it may, in the alternative, provide for a speed twice that of the lanes B1, B2 in order to assure passage of double the number of vehicles in one of the individual lanes B1, B2, respectively. In order to achieve this result, the progression of the guide lights in the lane of traffic B is so set that at the point of convergence, traffic from any one of the roadways B1, B2 is switched in between the traffic from the other roadway, B2, B1. This acceleration may be achieved, for example, by increasing the gap or distance between a pair of guide lights in the track or lane B1. If $u$ is the speed of the traffic in the lanes B1 and B2, the speed in lane B will then have to be $2u$, which means that the guide lights in the lane B2, for the same time periods, will have to be spaced twice that of anyone of the lanes B1 or B2.

Another solution is to introduce an out of phase relationship between the guide lights of the lanes B1 and B2, such that when the guide lights for lane B1 are green, the lights for B2 are red and vice versa.

If two or more lanes diverge, in form of a Y-intersection in which traffic goes against the direction of the arrow of FIG. 6, it is preferred to first utilize counters, such as pressure counters, to obtain information relative to the proportion of vehicles which take the one or the other divergent road. The speed of the guide lights of the one or the other road can then be adjusted in the inverse manner to that described with respect to the convergence of roads. Counting the number of vehicles in a given block or section further results in data relating to the length, or density, of vehicles in any one group or convoy. Adjustment of the timing cycle, and of the speed depending on the number of vehicles passing a given checkpoint can then be done by traffic computer arrangements as known in the art.

Counters can further be used to indicate, for example, on a luminous indicator, the numbers of parking spaces available at the side of the road; this information can be obtained by determining the difference between vehicles leaving and vehicles entering a given section or block. This information, made available by indicators at the beginning of the block, will prevent the entry of slow moving vehicles merely looking for parking spaces, and inhibiting free circulation of traffic.

The particular guide lights are arranged in such a way that they control primarily a single vehicle only; by "primary control" as used herein, is meant that the light distribution is such that essentially only the driver of a single vehicle will react to it, although the particular traffic guide light may be visible, though not with the intensity and brilliance desired, to the drivers or occupants of other vehicles, and particularly if the other vehicles are of unusual construction and do not have their drivers seat in the customary place. FIGS. 7 to 10 illustrate in greater detail a form of traffic control system; FIGS. 1 and 2 illustrate in general the arrangement along a roadway.

The traffic control signals for use in the system of the present invention are preferably mounted on a lane or roadway, for example, along a median line of the road in case of an ordinary two-lane highway; and, in case of a one-way, multi-lane highway at the left side of the lane, for vehicles having steering wheels on the left and driving at the right (for countries driving on the left, the side is reversed). The guide traffic lights are contained in housings, preferably mounted on the ground, or even recessed and cast into the roadway, and constructed to be solid and not subject to damage if a vehicle passes thereover. Alternatively, these signal lights can be placed along the side, for instance, along guide barriers, railings of bridges and the like.

Figure 7:
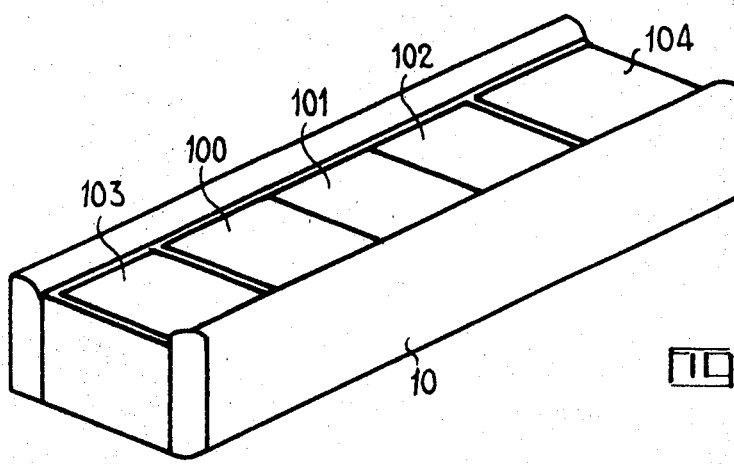
FIG. 7 is a pictorial illustration of another form of traffic control signal.
Figure 8:
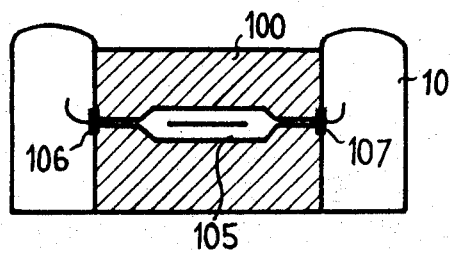
FIG. 8 is a vertical sectional view through the signal of FIG. 7.

FIG. 7 illustrates a housing 10, adapted to be recessed into a roadway, and containing three cells, 100, 101, 102, each holding a green, orange and red light respectively. Housing 10, at either end, further contains distribution boxes 103, 104, supplied with connecting contacts to receive the supply and control cables for the lamps. Preferably, housing 10 is formed of steel and has a flat surface, slightly bowed, to permit water to run off. FIG. 8 is a cross-sectional view of housing 10 at the level of section 100. The housing is recessed into the roadway so that the top of section 100 is approximately flush with the roadway itself. The side portions or borders are sufficiently large and strong in order to support vehicles passing thereover; a pressure capacity of 70 kg./cm.$^2$ is the average ground pressure of a wheel of a truck, and the strength of the housing, and the transparent traffic light sections 100, 101, 102 should be commensurate. Section 100 contains a lamp 105, schematically illustrated in cross-section in FIG. 8. Section 100 itself preferably consists of a solid block of glass, permanently set between the housing 10. Lamp 105 may already be color coded, and nested within block 100 (FIG. 8) or integral therewith. Electrical contacts to the lamp can then be made on either side by means of terminals 106, 107, connecting with electrical buses extending lengthwise of the housing. The lamps for sections 101, 102 may have their contacts offset with respect to the buses, so that a series of longitudinal buses, arranged along the sides of the housing can supply all lamps. The unit can readily be sealed to exclude water or moisture. The connecting buses can be secured to the sides of the housing, or of the blocks 100, 101, 102 by means of adhesives or the like.

Figure 9:
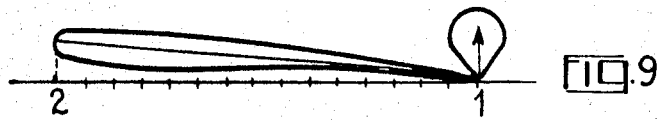
FIG. 9 is a light distribution diagram of the signal of FIG. 7.
Figure 10:
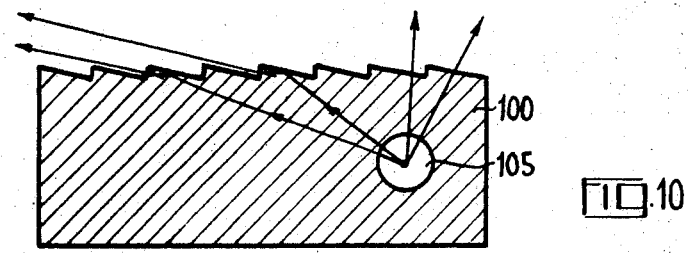
FIG. 10 is a longitudinal sectional view of the control signal light of FIG. 7 and illustrating the serrated face.

The top surface of each cell, containing a lamp, forms an optical system which concentrates a light bundle in lobes in such a manner that a bright light will appear to the driver of a vehicle (as previously indicated) for primary visibility of one vehicle or a limited number of vehicles only, but not in general to vehicles traveling in a group. The light is directed to be angled in such a manner that a driver can best see one light ahead when he is approximately even with the preceding guide signal. The distance of about 50 feet has been found to be adequate. The optical light distribution is illustrated in FIG. 9. The maximum lobe corresponds to an angle primarily visible to a driver of a vehicle approximately 50 feet from the guide signal 1 (FIG. 9), that is, approximately even with a guide signal 2, and about five to six feet up from road level. If it is also desired to give the driver at the same time, on a flat road, an indication of two successive lights, the main lobe can be arranged to permit visibility of signal light 1 up to about 100 feet, that is, over two guide signals. It is preferred that the driver may also see the light indication as he approaches the light closer, for example, up to about 25 feet. Preferably, a small secondary lobe is also provided which gives the driver an indication when he is about even with the light, and which permits drivers to observe a moving wave of green lights when the vehicles are densely together. The top surface of the blocks 100, of transparent material such as glass, is serrated as seen best in FIG. 10, forming successive prisms. Locating lamp 105 off center and longitudinally approximately in line with a small vertical section of a serration permits light rays extending vertically, whereas the long gradually slanting portions of the serrations internally reflect light rays to form the major lobe, as clearly appears from FIG. 10.

The connecting and control sections 103, 104 may be provided with blinkers or interruptors, so that drivers will have the impression of a continuous wave of green progressing along the lane of the highway. The interruptors or blinkers may be connected to selected ones of the guide light units, for example, to every other or every third one; if each light blinks, and the speed is substantial, the eye may be unable to distinguish between on and off condition of successive lights and perceive only a single green line. The repetition rate of the blinking itself may be controlled in accordance with the speed $u$ for a particular section, or block, so that a stationary observer would have the impression of a progression of green signal indications along the length of the traffic lane.

FIGS. 1 and 2 illustrate in pictorial representation the traffic control system in accordance with the present invention, and a different form of guide light. FIG. 2 illustrates further a supply cable, which can be connected to the guide lights, and which is formed as a flat cable, preferably colored and adapted to be secured for example as a median strip onto a highway. It is preferably made of an insulating plastic, for example containing reflective or luminescent material such as "scotch light" in one or more colors, which may serve at the same time as a center, or divider line for a traffic lane.

In accordance with an embodiment of the invention, the cables are supplied to an intersection signal control arrangement which periodically interrupts the supply of current to selected ones, or all of the green lamps, so that they will be sequentially energized, and will blink in a progressive series, the interval between blinks being determined by the number of vehicles entering a block in a predetermined time interval. Thus, the speed of vehicles entering a block can be controlled, and the vehicles guided along their traffic lanes in accordance with the progressive blinking of selected ones of the lights.

The intersection control arrangements themselves are well known. They may be connected to a central station by means of control lines, to control consoles or to computers in accordance with known traffic control schemes. The cyclical change of the traffic signals at the interchanges can be varied, and with such variation, the speed of traffic in selected blocks or sections can be changed; simultaneous variations of the cyclical rates will change the speed of traffic in the entire system being controlled.

Figure 11:
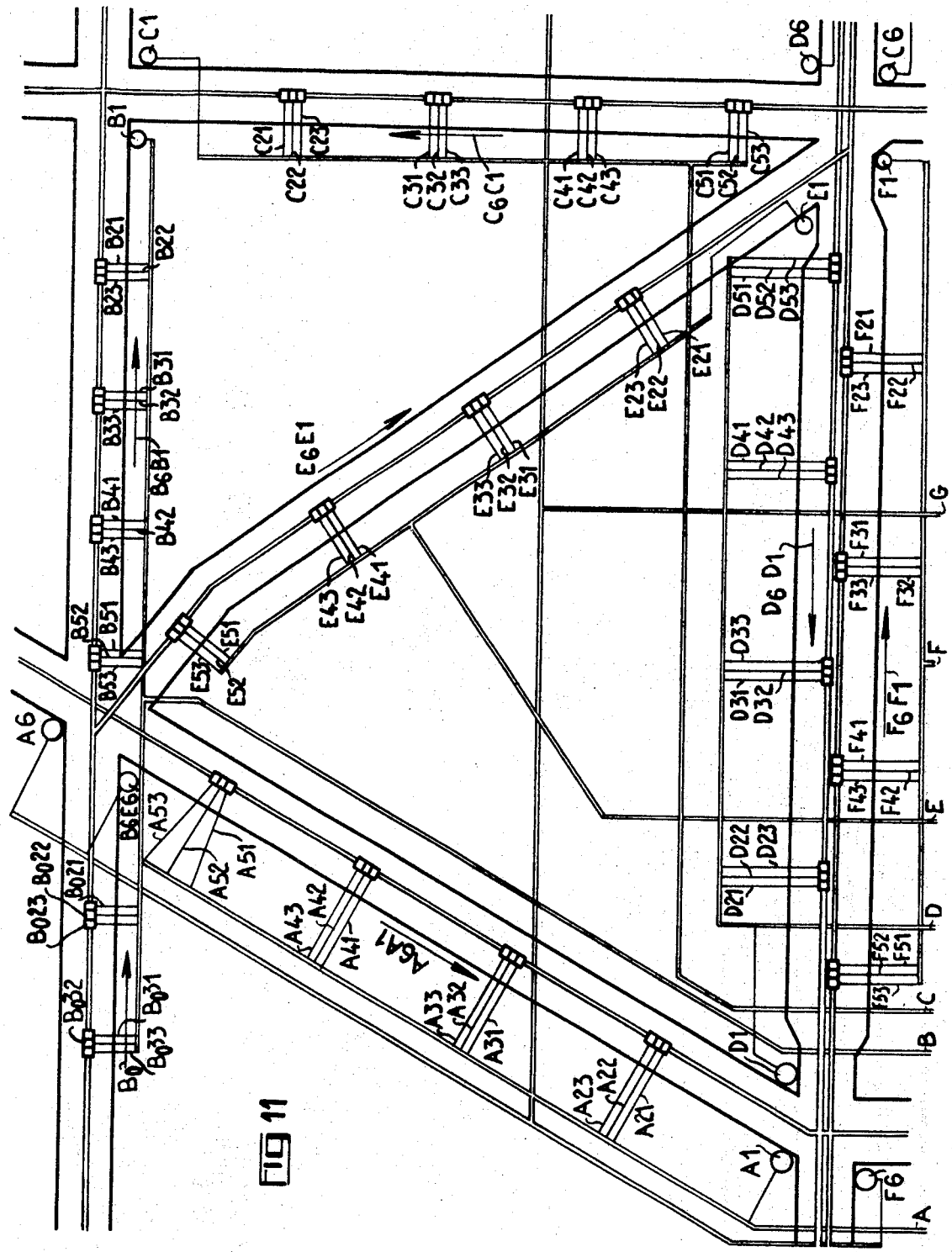
FIG. 11 illustrates a traffic control system with a plurality of roadways.

FIG. 11 shows an entire traffic control region, controlled in accordance with the present invention. The various signal and guide lights are indicated by a letter and a number, such as F1 and F6, for example, which define between them a lane of traffic, the direction of which is indicated by an arrow. The guide lights are represented by a letter followed by two numbers, the units (1, 2 or 3) indicating if the light is green, amber or red, as before; the tens number indicates the sequential light. Thus, guide light D21 is the second green light of section D. Cables A, B . . . G supply the guide lights of their lettered sections as will be described in detail below. It is to be noted that the route A1 to A6 is 166⅔ m. long, defined at its corners by two intersection traffic controls A1, A6, the cyclical repetition rate therebetween being 40 seconds. It contains four traffic guide lights, for changing state in accordance with a cyclical rate of two seconds, as has been described in connection with FIG. 4. The intersection control light C6 has a 60 second cycle; C1 a 40 second cycle. The determination of the average optimum speed is done in accordance with the embodiment of the invention described in connection with FIGS. 13 and 14.

The details of the cable connections for FIG. 11 have been rendered schematically, and have been placed beyond the traffic lanes for ease of understanding.

At intersection control light B6 a divergence occurs: traffic may move from B0 to B6 (left to right in FIG. 11) and then subdivides into two streams, one from B6 to B1 and the other from E6 to E1. This problem, the converse of the problem of merging traffic, is easily resolved as previously explained in connection with FIG. 6. Counters installed at the level of lights B6, B5, and E5 determine the amount of interchange traffic, and the proportion of vehicles which take the one branch B6–B1 or the other E6–E1. This information is utilized in order to determine the necessary acceleration of deceleration of traffic, and the proper speed of propagation of green light. The counters may operate in well known manner, for example, as pneumatic pressure counters, radar counters, magneto-electric counters and the like.

FIG. 11 thus illustrates an entire traffic control system which can be expanded in accordance with requirements.

Figure 12:
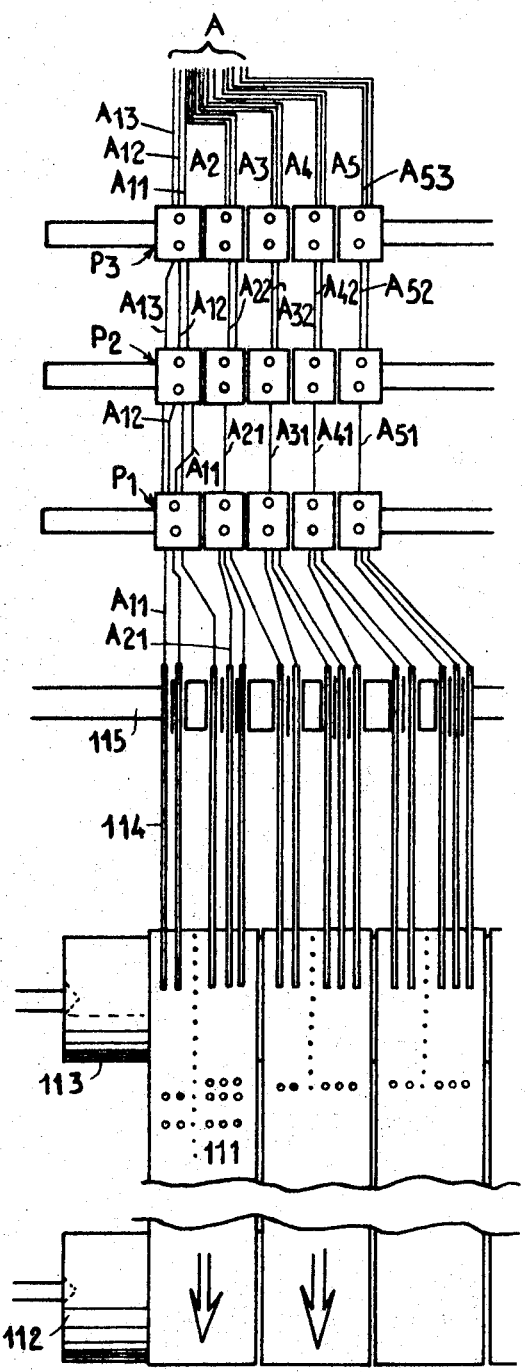
FIG. 12 is a partial view of a control apparatus for a zone to be controlled.

FIG. 12 illustrates a particular embodiment of current supply for a sub-section A containing guide signals A1 to A5, for example, as utilized in FIG. 11.

Three perforated tapes 111, each carrying five rows of holes, the repetition rate of which corresponds to various selected programs of progress of the lights A1 to A5, are spooled between spools 112, driven by a mechanism not shown, and an idler roller 113. The speed of rotation of spool 112 is constant. Fifteen styli 114 ride on the tape. When a perforation is sensed, contacts P1, P2 or P3 respectively are closed, corresponding respectively to green, amber or red light, and determining the application of a control impulse to an appropriate conductor, for example A21, A22, A23, etc. In accordance with the wiring diagram of FIG. 12, conductors A21, A22, A23 represent respectively current supplies to the green, orange and red lamps of guide light A2, in accordance with the notation adopted in the present specification. The various connections to sources of power supply have been omitted for purposes of clarity. The 15 conductors A11 to A53 all form a cable A, which, as seen in FIG. 11, controls the particular lights of the guideway A1 to A5.

Supply of the cables B, C, D, E, F, and G is similar, thus permitting automatic centralized control of the traffic control region as seen in FIG. 11.

It is understood that one may, of course, override the control by means of manual controls installed, for example, at a control station located at an intersection control traffic signal; in combination with communication systems in accordance with well known techniques, traffic can be efficiently controlled.

The present invention enables maintenance of an average speed which is in excess of that presently permissible because stopping time for red lights, and the delays occurring with the starting of columns of vehicles are avoided. The system of traffic control thus provides for a decrease in fuel consumption, use, and abuse of tires and brakes, as well as decrease of noise and air pollution as a consequence of repeated stopping and starting. Further, the safety of the guided roadway or guided lane is substantially increased because differences in speed between vehicles are avoided.

The cables on the roadway may include not only the power supply of control connections for the lamps, but also other electrical lines. Heater wires may further be embedded to prevent accumulation of snow and ice and provide for easy visibliity under all weather conditions, as well as to prevent damage by snowplows. The blinking of the lamps may be controlled centrally or by separate interruptors at the guide lamps in location control sections 103, 104 (FIG. 7); the blink-repetition rate of the green signal of any guide light may be fixed, or controlled in accordance with programmed optimum speed.

The traffic control system according to the present invention may be applied not only to highway control, but also to control of other moving vehicles, for example, to railways, aircraft control, and further in connection with control of vessels on rivers or canals.

Various modifications and changes may be made in the system, as well as in the fixtures disclosed in accordance with design requirements within the scope of the present invention.

What is claimed is:

1. Traffic control system for vehicles traveling in a predetermined block provided with intersection signals located at each end of said block, comprising a plurality of traffic control signals localized and positioned within said block so as to be visible from vehicles traveling on a roadway in said block, means for energizing any one traffic control color of said traffic control signals in sequence along the block with respect to the recurrence rate of change of signal colors of said intersection signals so as to determine at a given instant, colored zones of given length wherein vehicles are prohibited, temporarily admitted or permanently authorized according as the color of said zones, and means for blinking said traffic control signals along a zone at a rate dependent upon the vehicle density.

2. System according to claim 1, wherein the period of blinking of said traffic control signals between successive cycles of colors determines the distance between two successive vehicles passing along one of said traffic control signals whereby to obtain a positional control of each said vehicle in said block.

3. System according to claim 1, wherein said traffic control signals are spaced apart a given distance and the ratio of said distance to the time difference of occurrence of two successive traffic control signal cycles determines the speed of a vehicle passing successively along said signals, whereby to obtain a speed control of said vehicle in said block.

4. System according to claim 1, wherein said plurality of traffic control signals is so located on said roadway as to be visible from any vehicle traveling along a lane of said roadway in case of a multilane roadway, means being provided for controlling independently said signals relatively to said lanes.

5. System as claimed in claim 1 including further means counting the number of vehicles entering a block during a predetermined interval, wherein the period of blinking of said traffic control signals between successive cycles of colors is further determined by said number of vehicles having entered in said interval, whereby an optimum number of vehicles is admitted in a zone in accordance further with the required length of said zone.

6. System as claimed in claim 1 to control a plurality of adjacent blocks, each having intersection signals at their junction, and each comprising a plurality of traffic control signals, means being provided in each block for energizing any one traffic control color of said signals in sequence along said block with respect to said intersection signals at both ends of said block and other means for intermittently energizing in each said block said traffic control signals whereby said blinking signals give the appearance to travel along each block successively.

7. System as claimed in claim 4 having a plurality of lanes and said plurality of lanes joining in a single lane, wherein the traffic control colors of said blinking traffic control signals controlling said lanes are synchronized with each other to show green at different successive times and the traffic control color of the blinking signals of said single lane is controlled to show green for a duration of time, timed to provide for a group of vehicles formed of individual groups of vehicles in said plurality of lanes.

8. System as claimed in claim 7, wherein the blinking period of the traffic control signals on said single lane is modified with respect to that of said joining lanes so as to create a gap for the group of vehicles formed of the individual groups of vehicles in said joining lanes.

9. Arrangement as claimed in claim 7, wherein the period of blinking of the traffic control signals of said single lane is different from that of the joining lanes whereby the traffic in said single lane progresses at a speed different from that of progression in any joining lane.

10. System as claimed in claim 1 further including means sensing the entry of vehicles entering a block and means intermittently sequentially energizing the green color of said traffic control signals in a progressive series; the occurrence rate of sequential energization being determined by the length of the block and the desired speed of traffic moving therein; and the interval between sequential energization of any one lamp being determined by the number of vehicles entering said block in said predetermined time interval whereby to form a strip of vehicles of a determined length which moves at the desired speed along said block.

11. Controlled highway arrangement including the system of claim 1, wherein the highway is subdivided into blocks controlled by intersection signals located at both ends of the blocks, and the distance between traffic control signals showing the same traffic control color defines the length of roadway corresponding to the distance adapted to be occupied by a group of vehicles; the period of blinking of said traffic control color determining the speed and position of all said vehicles in said group, said period being matched to the length of a block of roadway and to the recurrence rate of change of intersection signal colors at both ends of said block.

12. Arrangement as claimed in claim 7 wherein the spacing between traffic control signals of said single lane is different from the spacing between signals of said joining lanes.

13. Arrangement as claimed in claim 11 including counter means counting the number of vehicles entering a block, and counter means counting the number of vehicles leaving a block; and means utilizing the difference between vehicles entering and vehicles leaving indicating the number of parking spaces available within the block.

14. Arrangement as claimed in claim 11 including means counting the number of vehicles present in a block when a traffic control signal shows "green" and the number of vehicles in a block when the traffic control signal shows "amber," the number of vehicles counted during the "amber" period indicating the overload of vehicles within a block.

15. System as claimed in claim 1 wherein the means energizing said traffic control signals in sequence include pre-programmed central traffic control means.

References Cited

UNITED STATES PATENTS

| 2,683,868 | 7/1954 | McKnight | 340—43 |
| 2,933,716 | 4/1960 | Soderberg | 340—35 |
| 3,090,032 | 5/1963 | Shand et al. | 340—35 |
| 3,114,506 | 12/1963 | Finch | 340—25 X |
| 3,110,010 | 11/1963 | Smith | 340—51 |

THOMAS B. HABECKER, Primary Examiner

C. M. MARMELSTEIN, Assistant Examiner

U.S. Cl. X.R.

340—43